Sept. 11, 1951  R. COLOMBO  2,567,275
APPARATUS AND METHOD OF GOFFERING THERMOPLASTIC MATERIALS
Filed Feb. 20, 1948
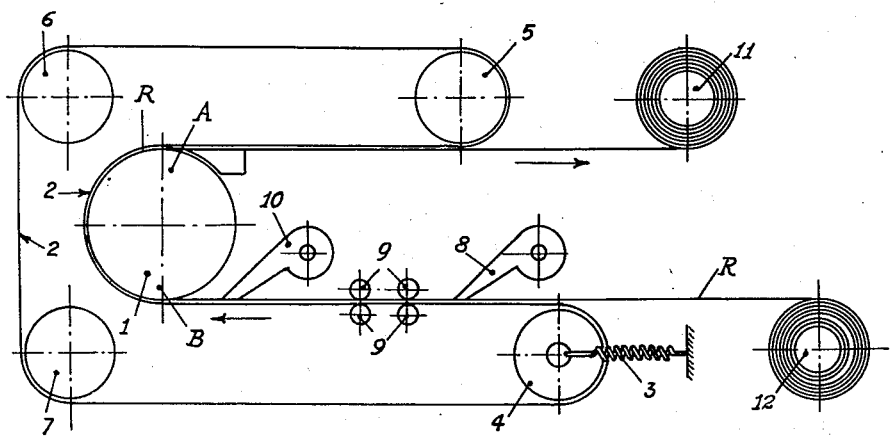
INVENTOR
ROBERTO COLOMBO
BY Haseltine, Lake + Co.
AGENTS Patented Sept. 11, 1951

2,567,275

UNITED STATES PATENT OFFICE 2,567,275

APPARATUS AND METHOD OF GOFFERING THERMOPLASTIC MATERIALS

Roberto Colombo, Turin, Italy

Application February 20, 1948, Serial No. 9,747
In Italy February 16, 1944

Section 1, Public Law 690, August 8, 1946
Patent expires February 16, 1964

4 Claims. (Cl. 18—6)

It is known that the endless stamping (goffering) of thermoplastic material in sheet, band, or plate form and the like meets with difficulties deriving chiefly from the fact that the material, for instance vinyl chloride, owing to its thermic inertia cools slowly and during this period, the stamping made on the hot material as it passes between the two goffering rolls tends to disappear again.

Hot goffering may be very well effected on plates of definite size, as it is then made, instead of between rolls as for endless goffering, between platens of a press on which the desired pattern is engraved. In this case the plate is subjected to heat and pressure between the dies and allowed to cool before removing it from the press.

The device according to this invention may be compared in its operation to an endless press which is heated and successively cooled, and is adapted to permit a neat and permanent even very deep engraving on sheets, bands, plates &c., of any length. It chiefly consists of a roll carrying the desired pattern and a steel band which is wound on a large arc of a circle on the roll and held strongly pressed thereagainst by the effect of a tension applied thereto, while the sheet, band or plate of thermoplastic material to be engraved unwinds and is carried along between the band and roll. The material undergoes a preliminary heating so that it comes between the band and roll at a temperature suitable for a satisfactory engraving, and the length of its path under pressure between the band and roll is calculated in such manner that the band or sheet of thermoplastic material is allowed to cool as it remains pressed against the pattern roll.

Further details of the invention shall be described hereinafter reference being had to the accompanying drawing which shows diagrammatically a construction of the device according to this invention.

1 denotes the roll provided on its cylindrical surface with the desired pattern, 2 denotes an endless steel band passing over the rolls 5, 6, 7 and 4, the latter acting as tensioning roll for the band under the action of the springs 3, and then winds up, for instance over half a circumference, over the roller 1 and is pressed thereagainst under a pressure which is brought to the degree required for goffering the material passing between the roll and band by conveniently adjusting the tension of spring 3. The material R to be engraved unwinds from the roll 12 and passes over the steel band 2, which is moved by means of the driving rolls 5, 6 and 7. Suitable heaters such as the hot air heaters 8 and 10 warm the material to the temperature required for a satisfactory goffering. The sheet or band R is conveniently pre-heated by the heater 8 as it begins to adhere to the band 2, whereupon it is slightly pressed by means of pairs of rolls 9 against the steel band in order to eliminate any air bubbles between itself and the band 2.

The material is then again heated by means of the heater 10 directly before passing between the band 2 and roll 1, and is thereby brought to the goffering temperature. The material is pressed together with its steel band against the pattern roll 1. The roll 1 is kept cool or just lukewarm as the case may be; in any case the temperature of the roll 1 is adjusted so that the material R entering at the goffering temperature at B between the band 2 and the roll 1 gradually cools as it is held pressed by the band 2 against the roll 1 which has the pattern engraved thereon, and issues at A sufficiently cool for preserving a sufficiently clear pattern. The material, after issuing at A, is further cooled, if necessary, and wound upon a roll 11.

For deep goffering it will be convenient to place under the steel band a further band of yielding material, such as wool, felt, or rubber, in order to facilitate sliding of the material into the engraving in the roll.

If it is desired to obtain on one side a pattern corresponding to the engraving in the roll 1, and on the other side a very slight patterning, for instance a satin-finish, it will be sufficient to correspondingly engrave the steel band.

When the face opposite the pattern should be for instance specular, it will be sufficient to chrome-plate the surface of the band 2.

I wish it to be understood that I do not desire to be limited to the exact details of construction shown and described, for obvious modifications will occur to a person skilled in the art.

What I claim is:

1. A continuous process of goffering thermoplastic sheets, which includes the steps of placing the thermoplastic sheet on an endless pressure band, heating said thermoplastic sheet on the face to be finished, passing the endless pressure band in a looped path about a substantial portion of the circumference of a rotating drum on which the pattern to be embossed is engraved, said drum being kept at a temperature lower than the temperature at which the thermoplastic sheet may be goffered, the thermoplastic sheet to be goffered being pressed over said looped path between the cooled rotating drum and endless pressure band, with its warmed face facing the engraved surface of the rotating drum.

2. A continuous process of goffering thermoplastic sheets, which includes the steps of placing the thermoplastic sheet on an endless pressure band, pressing said thermoplastic sheet on said endless pressure band by pressure rollers, heating said thermoplastic sheet on the facet to be finished when on the endless pressure band, passing the endless pressure band in a looped path about a substantial portion of the circumference of a rotating drum on which the pattern to be embossed is engraved, said drum being kept at a temperature lower than the temperature at which the thermoplastic sheet may be goffered, the thermoplastic sheet to be goffered being pressed over said looped path between the cooled rotating drum and endless pressure band, with its warmed face facing the engraved surface of the rotating drum.

3. Machine for the goffering of sheets, bands or the like of thermoplastic material comprising in combination a goffering roll kept at a temperature constantly lower than the embossing temperature of the thermoplastic material, an endless steel band embracing said goffering roll over a wide sector, means for tensioning the steel band on the goffering roll over a wide sector, means for actuating the steel band and goffering roll, means for feeding the thermoplastic sheet on the endless steel band, means for heating the thermoplastic sheet on the surface to be goffered at the embossing temperature before it reaches the goffering roll, the thermoplastic material being pressed between the steel band and goffering roll till the goffered material is sufficiently cool for preserving a neat pattern.

4. Machine for the goffering of sheets, bands or the like of thermoplastic material comprising in combination a goffering roll kept at a temperature constantly lower than the embossing temperature of the thermoplastic material, an endless steel band embracing said goffering roll over a wide sector, means for tensioning the steel band on the goffering roll over a wide sector, means for actuating the steel band and goffering roll, means for feeding the thermoplastic sheet on the endless steel band, means for heating the thermoplastic sheet on the surface to be goffered at the embossing temperature, before it reaches the goffering roll, the thermoplastic material being pressed between the steel band and goffering roll till the goffered material is sufficiently cool for preserving a neat pattern.

ROBERTO COLOMBO.

REFERENCES CITED

The following references are of record in the file of this patent:

UNITED STATES PATENTS

| Number | Name | Date |
|---|---|---|
| 986,162 | Gare | Mar. 7, 1911 |
| 1,260,002 | Lanhoffer | Mar. 19, 1918 |
| 2,218,227 | Winnek | Oct. 15, 1940 |
| 2,318,111 | Steinberger | May 4, 1943 |
| 2,446,771 | Knowland | Aug. 10, 1948 |

FOREIGN PATENTS

| Number | Country | Date |
|---|---|---|
| 2,939 | Great Britain | Feb. 7, 1903 |